US011697717B2

(12) United States Patent
Holzner et al.

(10) Patent No.: US 11,697,717 B2
(45) Date of Patent: Jul. 11, 2023

(54) METHOD FOR PRODUCING A PROPHYLACTIC ARTICLE

(71) Applicant: Semperit Aktiengesellschaft Holding, Vienna (AT)

(72) Inventors: Armin Holzner, Ternitz (AT); Wolfgang Kern, Seiersberg (AT); Jakob Cornelius Manhart, Giesshuebl (AT); Melahat Sahin, Leoben (AT); Raimund Schaller, Neunkirchen (AT); Sandra Schloegl, Stallhofen (AT)

(73) Assignee: SEMPERIT AKTIENGESELLSCHAFT HOLDING, Vienna (AT)

( * ) Notice: Subject to any disclaimer, the term of this patent is extended or adjusted under 35 U.S.C. 154(b) by 1006 days.

(21) Appl. No.: 16/081,481

(22) PCT Filed: Mar. 2, 2017

(86) PCT No.: PCT/AT2017/060052
§ 371 (c)(1),
(2) Date: Aug. 31, 2018

(87) PCT Pub. No.: WO2017/147638
PCT Pub. Date: Sep. 8, 2017

(65) Prior Publication Data
US 2019/0112436 A1    Apr. 18, 2019

(30) Foreign Application Priority Data

Mar. 4, 2016    (AT) .............. A 50175/2016

(51) Int. Cl.
| C08J 5/02 | (2006.01) |
| A41D 19/00 | (2006.01) |
| B29C 41/00 | (2006.01) |
| C08J 3/26 | (2006.01) |
| G01N 21/88 | (2006.01) |
| G01N 21/85 | (2006.01) |
| B07C 5/342 | (2006.01) |
| B29C 41/14 | (2006.01) |
| B29C 41/22 | (2006.01) |
| B29K 7/00 | (2006.01) |
| B29L 31/48 | (2006.01) |

(52) U.S. Cl.
CPC ............ C08J 5/02 (2013.01); A41D 19/0062 (2013.01); B07C 5/3425 (2013.01); B29C 41/003 (2013.01); C08J 3/26 (2013.01); G01N 21/85 (2013.01); G01N 21/8806 (2013.01); A41D 2500/54 (2013.01); B29C 41/14 (2013.01); B29C 41/22 (2013.01); B29K 2007/00 (2013.01); B29L 2031/4864 (2013.01); C08J 2309/04 (2013.01); C08J 2309/10 (2013.01); C08J 2313/02 (2013.01); G01N 2021/8816 (2013.01); G01N 2021/8835 (2013.01); G01N 2021/8845 (2013.01)

(58) Field of Classification Search
CPC ............ A41D 19/0062; A41D 2500/54; A61B 42/00; B07C 5/3425; B29C 41/003; B29C 41/14; B29C 41/22; B29K 2007/00; B29L 2031/4864; C08J 3/26; C08J 5/02; C08J 2309/04; C08J 2309/10; C08J 2313/02; C08K 9/02; C08K 9/04
See application file for complete search history.

(56) References Cited

U.S. PATENT DOCUMENTS

| 3,036,980 | A | * | 5/1962 | Dunham, Jr. ......... C08F 283/01 523/211 |
| 6,864,315 | B1 | * | 3/2005 | Hakuta ................... C08L 23/16 525/105 |
| 8,673,993 | B2 | | 3/2014 | Holzner et al. |
| 9,243,117 | B2 | | 1/2016 | Khoo et al. |
| 9,279,038 | B2 | | 3/2016 | Schaller et al. |
| 9,290,632 | B2 | | 3/2016 | Holzner et al. |
| 9,834,665 | B2 | | 12/2017 | Enomoto et al. |
| 9,894,946 | B2 | | 2/2018 | Holzner et al. |
| 10,023,728 | B2 | | 7/2018 | Cha et al. |
| 2005/0014854 | A1 | * | 1/2005 | Carcich ................... C08K 3/34 521/50 |
| 2006/0074185 | A1 | | 4/2006 | Ganapathiappan et al. |
| 2008/0207809 | A1 | | 8/2008 | Koide |
| 2008/0227913 | A1 | * | 9/2008 | Koide ....................... C08K 3/22 525/54.3 |

(Continued)

FOREIGN PATENT DOCUMENTS

| CA | 2224609 A1 | 6/1998 |
| EP | 1 762 586 A2 | 3/2007 |

(Continued)

OTHER PUBLICATIONS

Rajeev et al.; Rubber Chemistry and Technology, 2002, vol. 75, No. 3, p. 475-510.*
Shin Etsu; Silane Coupling Agents, 2015, p. 1-24.*
Blum et al.; Journal of Adhesion Science and Technology, 1991, vol. 5, No. 6, p. 479-496.*
Thakur et al.; Macromolecular Materials and Engineering, 2009, vol. 294, p. 561-569.*
International Search Report of PCT/AT2017/060052, dated Jul. 17, 2017.

(Continued)

*Primary Examiner* — Robert S Jones, Jr.
(74) *Attorney, Agent, or Firm* — Collard & Roe, P.C.

(57) ABSTRACT

The invention relates to a method for the manufacture of a prophylactic article, especially of a glove, from a (carboxylated) diene rubber, according to which a layer of a (carboxylated) diene latex is applied on a former and the (carboxylated) diene latex is cross-linked with a cross-linking agent, which is immobilized on inorganic and/or organic particles with formation of modified particles, and the modified particles are added to the (carboxylated) diene latex.

10 Claims, 6 Drawing Sheets

(56) References Cited

U.S. PATENT DOCUMENTS

| | | | |
|---|---|---|---|
| 2009/0101205 A1 | 4/2009 | Venderbosch et al. | |
| 2010/0152365 A1 | 6/2010 | Han et al. | |
| 2011/0289655 A1 | 12/2011 | Schaller | |
| 2014/0096307 A1 | 4/2014 | Holzner et al. | |
| 2014/0096308 A1 | 4/2014 | Holzner et al. | |
| 2014/0148553 A1* | 5/2014 | Moncino | C08C 1/04 525/154 |
| 2016/0272794 A1* | 9/2016 | Han | B29C 41/14 |

FOREIGN PATENT DOCUMENTS

| | | | |
|---|---|---|---|
| EP | 2 389 820 A1 | 11/2011 | |
| EP | 2 719 710 A1 | 4/2014 | |
| EP | 2 719 720 A1 | 4/2014 | |
| GB | 1 074 179 A | 6/1967 | |
| JP | H10231381 A | 9/1998 | |
| JP | 2003165870 A | 6/2003 | |
| JP | 2009155634 A | 7/2009 | |
| JP | 2009530432 A | 8/2009 | |
| JP | 2013508528 A | 3/2013 | |
| JP | 2017532406 A | 11/2017 | |
| WO | 2010/105283 A1 | 9/2010 | |
| WO | 2011/068394 A1 | 6/2011 | |
| WO | WO2012171090 A1 * | 12/2012 | C01B 33/18 |
| WO | WO2014142424 A1 * | 9/2014 | B29C 41/14 |
| WO | 2015/129871 A1 | 9/2015 | |

OTHER PUBLICATIONS

International Search Report of PCT/AT2017/060053, dated Jul. 12, 2017.

H. Mohd. Ghazaly et al., "Some Factors Affecting Dipped Nitrile Latex Films", J. Rubb. Res., 4(2), 88-101 (2001).

Siriyong et al., "Utilization of Different Curing Systems and Natural Zeolite as Filler and Absorbent for Natural Rubber/Nitrile Rubber Blend", Kasetsart J. (Nat. Sci.) 46 : 918-930 (2012).

Amornchaiyapitak et al., "Modification of epoxidised natural rubber film surface by polymerisation of methyl methacrylate", European Polymer Journal 44 (2008) 1782-1788.

Lenko et al., "Dual Crosslinking of Carboxylated Nitrile Butadiene Rubber Latex Employing the Thiol-ene Photoreaction", Journal of Applied Polymer Science (2013) 2735-2743.

Schloegl et al., "Photo-vulcanization using thiol-ene chemistry: Film formation, morphology and network characterisitcs of UV crosslinked rubber latices", Polymer 55 (Jun. 10, 2014) 5584-5595.

Universitat Bayreuth: "Clay and Clay Minerals: Hectorite Festkörperpraktrikum Modul AC III 2014", Jan. 2014 (Jan. 1, 2014), XP055389066, Retrieved from the Internet: URL: http://www.acl.uni-bayreuth.de/de/teaching/downloads/Ton_and_Tonminerale_ Hectorit_ english.pdf.

DIN 55672-3, Gel permeation chromatography (GPC)—Part 3: Water as eluent, Aug. 2007, pp. 1-27.

DIN 51562-1, Determination of kinematic viscosity using the Ubbelohde viscometer, Part 1: Apparatus and measurement procedure, Jan. 1999, pp. 1-10.

Valentín et al., Uncertainties in the Determination of Cross-Link Density by Equilibrium Swelling Experiments in Natural Rubber, Macromolecules 2008, 41, pp. 4717-4729.

Zaborski et al., Silica Modified by use of Organosilanes as a Filler for Carboxylated Butadiene-Acrylonitrile Rubber, KGK Kautschuk Gummi Kunststoffe 58, 2005, pp. 354-357.

ASTM Standard D 412-98a, "Standard Test Methods for Vulcanized Rubber and Thermoplastic Elastomers-Tension," (Reapproved 2002), pp. 1-14.

Letter from the Austrian Patent Attorney to the European Patent Office in PCT/AT2017/060052, dated Apr. 11, 2018, with English translation of relevant parts.

Letter from the Austrian Patent Attorney to the European Patent Office in PCT/AT2017/060053, dated Apr. 12, 2018, with English translation of relevant parts.

\* cited by examiner

METHOD FOR PRODUCING A PROPHYLACTIC ARTICLE

CROSS REFERENCE TO RELATED APPLICATIONS

This application is the National Stage of PCT/AT2017/060052 filed on Mar. 2, 2017, which claims priority under 35 U.S.C. § 119 of Austrian Application No. A50175/2016 filed on Mar. 4, 2016, the disclosure of which is incorporated by reference. The international application under PCT article 21(2) was not published in English.

The invention relates to a method for the manufacture of a prophylactic article, especially of a glove, from a (carboxylated) diene rubber, according to which at least one layer of a (carboxylated) diene latex is applied on a former and the (carboxylated) diene latex is cross-linked with a cross-linking agent.

Furthermore, the invention relates to a prophylactic article, especially glove, comprising a layer of a (carboxylated) diene elastomer, wherein the (carboxylated) diene elastomer molecular chains of the (carboxylated) diene elastomer are cross-linked covalently via organic molecules and ionically via metal cations.

In addition, the invention relates to the use of inorganic and/or organic particles, on which a cross-linking agent is immobilized with formation of modified particles.

Prophylactic articles, such as surgical and examination gloves in particular, are usually manufactured from an elastomer latex by dipping of hand-shaped dipping formers. A film from which the finished disposable glove is subsequently obtained by vulcanization or cross-linking of the latex is formed on the dipping formers.

Prophylactic articles of natural latex have a relatively high allergy potential. For this reason, synthetic latices are being increasingly used for the manufacture of the prophylactic articles. However, even these are not entirely hypoallergenic, since they may still contain allergens from the manufacturing process, such as powder for improvement of the ability to be slipped on, for example, or process chemicals, such as cross-linking chemicals or cross-linking accelerators, for example.

In order to counter these problems, methods for the manufacture of prophylactic articles with reduced allergy potential have already been proposed in the prior art.

For example, WO 2011/068394 A1 describes a method according to which a methacrylic acid and ZnO are added to a carboxylated nitrile butadiene. Thereby self-cross-linking properties are imparted to this mixture, and so it is possible to dispense with sulfur-containing cross-linkers and accelerators. As in the past, however, this composition still contains the heavy metal Zn, and so a certain allergy potential remains.

Similarly to this, US 2010/0152365 A1 describes the use of a carboxylated nitrile butadiene copolymer for the manufacture of a glove by means of dipping methods. Once again, ZnO is used for ionic cross-linking.

For adjustment of particular mechanical properties of elastomer gloves comprising XNBR, it is known to add fillers to the latex. For example, H. Mohd. Ghazaly et al., "Some Factors Affecting Dipped Nitrile Latex Films", J. Rubb. Res., 4(2), 88-101, describe the use of fused silica and silane-modified silica, wherein it is stated in that publication that no significant changes of the film-forming properties were observed due to the use of silane-modified silica. Either sulfur or ZnO is used for cross-linking.

From Tutchawan Siriyong and Wirunya Keawwattana, "Utilization of Different Curing Systems and Natural Zeolite as Filler and Absorbent for Natural Rubber/Nitrile Rubber Blend", Kasetsart J. (Nat. Sci.) 46: 918-930 (2012), it is known that the tensile strength and the 100% modulus are increased by the use of zeolite in NR/XNBR blends. The cross-linking takes place by conventional sulfur vulcanization or by means of peroxide cross-linking. In this connection, the sulfur systems exhibited the greatest increase of the tensile strength. The zeolite is used as sorbent, in order to increase the oil resistance of the rubber product. For this application, the peroxide cross-linking achieves the best results. Based on the results in that publication, especially the increased tensile strength, the sulfur cross-linking is to be preferred as regards the manufacture of prophylactic articles, especially gloves, by virtue of their thin-walled nature. In contrast, the increase of the 100% modulus argues against the use of these results in the manufacture of gloves, since therewith the wearing comfort is reduced.

It is further known to modify the surface of natural rubber gloves in order to reduce their allergy potential. Thus US 2014/0096307 A1, for example, originating from the Applicant, describes a method for modification of the surface of an elastomer with unsaturated carbon-carbon bonds, which become saturated in the region of the surface at least partly by a photochemical reaction with at least one thiol. Solid particles, including zeolite particles, that are bound covalently on the surface of the glove, may be used for saturation. This modification of the glove surface takes place after the dipping of the carrier layer comprising the nature rubber by application of the particles on the surface of the carrier layer. In the finished glove, the particles are therefore on the inside of the gloves, since these are turned inside out for pulling off after the dipping.

Similarly to this, US 2014/0096308 A1, likewise attributed to the Applicant, describes among other aspects the binding of zeolite particles to a natural rubber glove via epoxy groups.

The task underlying the present invention is to create an improved prophylactic article.

In the method cited in the introduction, the task is accomplished by the fact that the cross-linking agent is immobilized on inorganic and/or organic particles with formation of modified particles, and the modified particles are added to the (carboxylated) diene latex.

Furthermore, the task of the invention is accomplished by the prophylactic article cited in the introduction, in which the metal cations are part of inorganic particles and the organic molecules are immobilized on the inorganic particles.

Finally, the task of the invention is accomplished by the use of inorganic and/or organic particles, on which a cross-linking agent is immobilized with formation of modified particles for cross-linking of a (carboxylated) diene latex.

In this connection, it is of advantage that the particles migrate not at all or only very slowly out of the prophylactic article. In this connection, slow means that the migration time is very much longer than the duration of use of the prophylactic article. In this way the cross-linking agent is prevented from coming into contact with the human skin, whereby the allergy potential of the prophylactic article can be significantly reduced. Even during the storage of the prophylactic article, the migration of the cross-linking agent out of the prophylactic article can be prevented or significantly reduced. In addition, leaching processes for removal of unbound process chemicals can thereby be shortened or even omitted. The immobilized cross-linking agent may be a multifunctional monomer and/or polymer or mixtures thereof. With the method, it is possible to manufacture a prophylactic article that has very good mechanical properties and high aging and gamma resistance. Even an influence on the film formation during the manufacturing process, especially the dipping process, has not been proved, and so no further measures are needed in that respect. A further advantage of the method can be seen in the fact that a preliminary cross-linking of the (carboxylated) diene latex is not necessary, and so continuous mixing methods may be used and the process workflows can be accelerated. With the method, an energy-efficient, sustainable and production-efficient manufacture of hypoallergenic prophylactic articles is possible, especially of surgical and examination gloves.

According to a preferred embodiment variant of the method, it may be provided that exclusively the modified particles are used as cross-linking agents. In this way the effects cited in the foregoing can be further improved, wherein it may be additionally achieved that, by the omission of heavy metal ions, such as $Zn^{2+}$ from ZnO, for example, the allergy potential can be further reduced (as an example, zinc can be extracted from the elastomer with carboxylic acids, such as acetic acid, for example). Beyond this, no influence of another cross-linking system can occur, as is sometimes reported in the prior art.

According to a further preferred embodiment variant of the method, it may be provided that silicate-based particles are used as inorganic particles. With silicate-based particles, besides the covalent cross-linking of the molecules of the (carboxylated) diene latex, an ionic cross-linking is achievable via their cation, for example $Ca^{2+}$. In this way it is more simply possible to omit additional cross-linking agents, for example the frequently used ZnO, for achievement of higher tear strengths of the prophylactic article. Higher tear strengths are achieved via the ionic network sites, while covalent bonds impart an improvement with respect to the reduction of the hole-formation susceptibility of the prophylactic article during wearing. After the particles have been embedded in the elastomer, especially bound physically and/or mechanically, they do not migrate out of the prophylactic article, and so also no problems with powders occur with respect to the allergy potential of the prophylactic article.

According to another embodiment variant of the method, it is provided that the silicate-based particles are selected from a group consisting of silicates with multivalent cations, zeolites, $SiO_2$ as well as mixtures thereof. Thus a further improvement of the effects cited in the foregoing is achievable. In addition, a better incorporation of the silicate-based particles in the elastomer layer can be achieved with zeolite via its voids, and so therefore the silicate-based particles can be more simply bound exclusively physically or mechanically with the first layer. In addition, the further benefit can be achieved in this way that these particles are also able to act adsorbently for any contaminants that may have migrated into the first layer from outside or from the inside of the prophylactic article.

According to an embodiment variant thereof, it may be provided that the zeolite is a natural zeolite. Besides the cost factor—synthetic zeolites are much more expensive than natural—it is then of advantage that natural zeolites have a more non-uniform structure in comparison with synthetic. Thus the mechanical properties of the prophylactic article are inherently less influenced on the whole by the natural zeolite than by the use of a synthetic zeolite.

In the course of conducted tests, a zeolite selected from a group consisting of clinoptilolite, chabasite, phillipsite and analcime as well as mixtures thereof has proved to be particularly suitable. This is all the more surprising, in that these zeolites belong to different structural classes.

It is also of advantage when the particles are modified with an excess of cross-linking agent, especially with siloxanes having epoxy groups, for formation of a multiple-layer structure of the cross-linking agent on the particles. Due to the covalent binding of the cross-linking agent on the particles, one part of the anchor groups/network-forming groups is hydrolyzed. These are therefore no longer available for the cross-linking. For this reason, the use of an excess of cross-linking agent is of advantage, since therewith a multiple-layer structure is formed on the surface of the particles. In this multiple-layer structure, the first layer is covalently bound to the particles and hydrolyzed, just as before, but in the further layers no hydrolysis of the anchor groups/network-forming groups takes place, so that on the whole the reactivity of the particles provided with the cross-linking agent is better.

The cross-linking of the (carboxylated) diene latex molecules can be achieved thermally. Thus the cross-linking of the latex molecules can already take place during the drying of the latex film dipping-applied onto the dipping former, whereby an increase of efficiency of the method is achievable. In particular, the embodiment variant is of advantage when the particles are doped with an excess of cross-linking agent.

Preferably, the pH of the (carboxylated) diene latex is adjusted to a value of greater than/equal to 9. A distinct improvement of the reaction kinetics has been observed with pH values of 9 or higher, whereby the cross-linking of the molecules is able to take place more rapidly.

The cross-linking agent may be selected from a group consisting of multifunctional epoxides, multifunctional silanes, multifunctional siloxanes, multifunctional thiols. In this connection, it is of advantage when these (i) are water-soluble, since no emulsifier is needed during the introduction of the cross-linking agent into the latex mixture; (ii) have more than one epoxy function for the cross-linking of the rubber chains. Preferably, the multifunctional epoxides have a structure that the hydrolysis product has "nurturing" properties, such as, for example diglycidyl-terminated polyethylene glycol derivative, epoxy-sorbitol derivative, derivative of a sugar alcohol. Furthermore, it is possible to use, for example, monosaccharides and polysaccharides with epoxy functionalities.

It is of advantage for the multifunctional thiols when they (i) have a high molar mass (molar mass between 200 g/mol and 4000 g/mol); (ii) a high mercapto equivalent number (at least 20%, especially at least 50% of the monomer units should carry SH— groups); (iii) are accessible via simple synthesis strategies.

It is of advantage for the multifunctional silanes and siloxanes when they (i) carry more than one reactive group (e.g. CoatOSil MP200 leads to higher tear strengths than 3-glycidoxypropyltrimethoxysilane); (ii) the silanes carry at least one trialkoxy group (for coupling to the filler and for formation of oligo layers via physical interactions).

Besides the exclusive use of the modified particles as cross-linkers, it may be provided according to another embodiment variant that a multifunctional monomer and/or polymer is used as additional cross-linking agent, which is added to the (carboxylated) diene latex and dissolved therein. The multifunctional monomers and/or polymers have the advantage of simpler handling, since the soluble monomer and/or polymer can be mixed into the latex without prior dispersion or emulsion. Via this additional, further covalent cross-linking agents can be formed in the elastomer. In addition, the modulus of the prophylactic article can be adjusted better in this way, especially when, according to a further embodiment variant thereof, an organic monomer and/or polymer is used that has a molar mass between 170 g/mol and 4000 g/mol. In this way, a better wearing comfort can be achieved for the user of the prophylactic article. This is of importance in that, by the incorporation of the particles into the elastomer layer, a change of the mechanical properties of the prophylactic article was observed.

For better understanding of the invention, it will be explained in more detail on the basis of the following figures, wherein.

Figure 1:
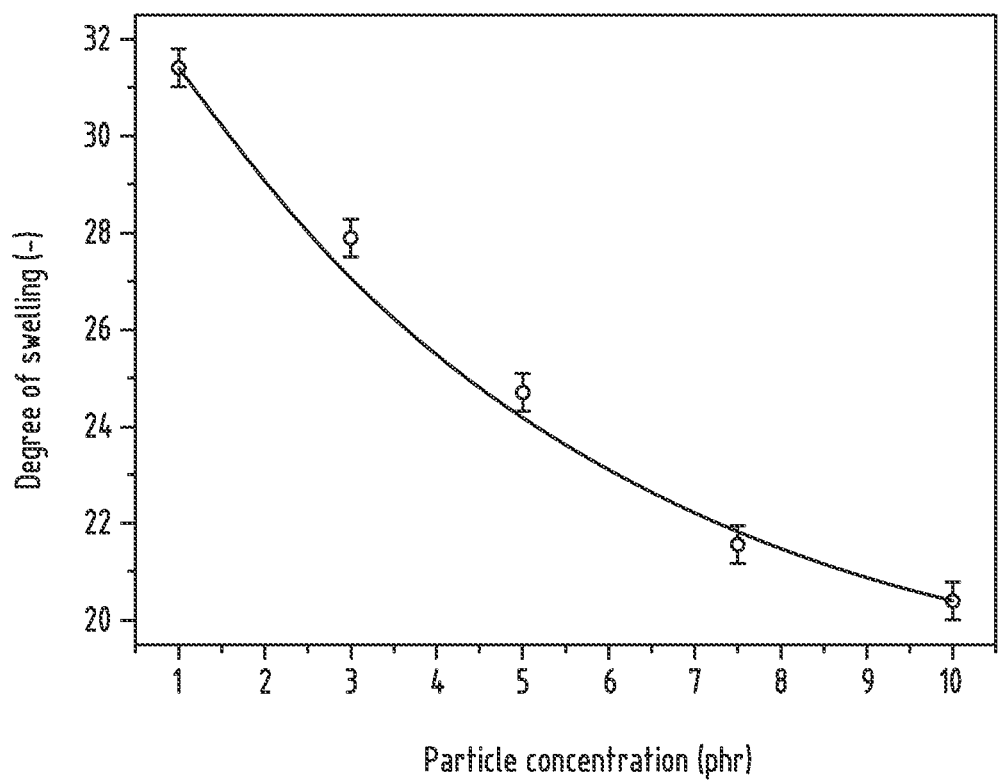
FIG. 1 shows the degree of swelling of cross-linked XNBR latex films (not preliminarily cross-linked; thermal cross-linking in the course of drying at 100° C. for 15 min) at different Rima Sil 1200 concentrations.

All standards cited in the description refer to the version in force on the date of application of the subject patent application, unless otherwise indicated.

The invention relates to a method for the manufacture of a prophylactic article.

The prophylactic article is preferably a glove, especially a surgical glove (glove for operations) or an examination glove. However, the prophylactic article may also be, for example, a finger stall, a catheter, a condom, a (medical) balloon, a teat, etc. In general, the prophylactic article is preferably a dipped article, i.e. a product that is manufactured by means of a dipping method.

In the following, only the formation of the prophylactic article as a glove will be discussed further. Nevertheless, the explanations in this regard may also be applied to other elastomer articles, especially dipped articles that are manufactured according to a dipping method.

The glove comprises a diene elastomer (diene rubber), especially a carboxylated diene elastomer, or consists of the same.

The elastomer of the elastomer layer may be based both on a natural latex and on a synthetic latex. These may be selected from a group comprising or consisting of natural rubber (NR), polyisoprene latex (IR), nitrile butadiene rubber latex (NBR), carboxylated nitrile butadiene rubber latex (XNBR), carboxylated butadiene latex (XBR), chloroprene latex (CR), styrene-butadiene latex (SBR), carboxylated latices prepared from polymer blends and mixtures thereof.

In particular, a carboxylated nitrile butadiene rubber latex is used for the manufacture of the elastomer layer. This preferably has a proportion of acrylonitrile between 15 wt % and 40 wt %, especially between 20 wt % and 35 wt %.

The prophylactic article or the elastomer glove is preferably manufactured according to a dipping method. Such dipping methods are known in principle from the prior art, and so the pertinent prior art should be consulted for details in this respect.

In this method, essentially a dipping former (in the series fabrication, usually several dipping formers are used) is dipped into a dipping bath. This dipping former has the shape of the finished product, i.e. the shape of a hand, for example.

The respective elastomer latex to be dipping-applied onto the dipping former is introduced beforehand into the dipping bath.

In principle, however, any other suitable shape may be used in the method presented in this description, especially when the elastomer layer is not manufactured according to the dipping method. The elastomer layer may also be prepared by brushing or spraying the elastomer latex onto a former. Likewise, other suitable methods of application of the latex onto a former are applicable.

In this description, the term elastomer latex is used in a way corresponding to usual practice in the language of the art. Accordingly, an elastomer latex is a dispersion of polymer molecules that are non-cross-linked or preliminarily cross-linked or can be cross-linked for the preparation of an elastomer. Within the scope of the invention, therefore, preliminarily cross-linked elastomer latices may also be processed, wherein the preliminary cross-linking may be achieved in particular by means of the cross-linking agents cited in this description.

It is further possible, however, that the elastomer latex is cross-linked only after the application onto the former, i.e. the applied elastomer matrix.

A customary process route of a coagulant dipping method may comprise, for example, the following method steps:
washing of the dipping former and degreasing with an organic solvent;
preheating the dipping former;
dipping the dipping former into a first dipping bath containing a coagulant;
drying of the first dipping-applied layer;
dipping of the dipping former into a further dipping bath for formation of the elastomer layer;
drying/vulcanization (cross-linking);
pulling the dipped article off from the former.

For the case that the elastomer glove is formed in multiple-layer manner, further layers of the first elastomer latex or of another elastomer latex or of another polymer may be dipping-applied or generally applied. For example, a polymer layer may be dipping-applied as the last layer which, after the pulling of the glove off from the dipping former, becomes disposed on the inside of the glove after the turning of the glove inside out that takes place in the process. Such polymer layers may be formed, for example, as sliding layers, in order to improve the ability of the elastomer glove to be pulled off.

Thus the elastomer glove may be formed in single-layer or multiple-layer manner, wherein the individual layers may consist of materials that are different from one another or of the same materials. It is also possible that two or more layers of the elastomer glove consist of the same material and one or more layers consist of a material different from those.

Since all this is inherently known, it will not be further discussed.

As used in this description, materials will be understood as elastomers and polymers, but the elastomer glove will have at least one layer of an elastomer.

The terms vulcanization and cross-linking will be used synonymously in this description.

For cross-linking of the (carboxylated) diene elastomer latex, a cross-linking agent will be added thereto, i.e. especially to the dipping bath for the manufacture of the at least one layer of the (carboxylated) diene elastomer. In addition, the diene elastomer latex or the dipping bath may contain at least one further additive, such as, for example, at least one emulsifier, at least one antioxidant, at least one dye, at least one anti-ozonant, such as are inherently known for the manufacture of dipped articles. The total proportion of these additives may amount to between 0.1 phr and 10 phr relative to the total composition of the diene elastomer latex or of the dipping bath.

The cross-linking agent, immobilized on inorganic and/or organic particles with formation of modified particles, is added to the (carboxylated) diene elastomer latex. The particles are not soluble in the (carboxylated) diene elastomer latex. In addition to these, a further cross-linking agent on monomer and/or polymer basis (for example, thiols or non-polar epoxides) may be dissolved or emulsified in the (carboxylated) diene elastomer latex. In this case, a multi-functional monomer and/or polymer may be used as the further cross-linking agent. However, the possibility also exists that the particles are modified with the multifunctional monomer and/or polymer that is used as cross-linking agent.

In the preferred embodiment variant of the method, no further cross-linking agent are used, i.e. exclusively the modified particles are used as cross-linking agents.

It is further preferred when the (carboxylated) diene elastomer latex is cross-linked after the application onto the former. However, a preliminary cross-linking of the (carboxylated) diene elastomer latex is also possible, for example even with the particles on which the cross-linking agent is immobilized.

The particles used may be of inorganic and/or organic nature.

The organic particles may be selected from a group comprising or consisting of polydimethylsiloxanes, silicone resins, urea resins, epoxy resins, diene elastomers.

The inorganic particles may be selected from a group consisting of or comprising silicate-based particles, $SiO_2$, carbonates, oxides.

Preferably, silicate-based particles are used as inorganic particles.

The silicate-based particles are preferably selected from a group comprising or consisting of silicates with multivalent cations, for example wollastonite, zeolites, as well as mixtures thereof.

According to one embodiment variant of the elastomer glove and its method for manufacture, the silicate-based particles consist of a zeolite, especially a natural zeolite, wherein it is preferred to use clinoptilolite, chabasite, philipsite, analcime as well as mixtures thereof as the zeolite. According to a further preferred embodiment variant, clinoptilolite is used as the natural zeolite. However, it is also possible that the zeolite is a synthetic zeolite.

Depending on deposit, natural zeolite contains a more or less large proportion of accompanying minerals, especially quartz. For the use of natural zeolite in the method for the manufacture of the elastomer glove, a natural zeolite is preferably used that has a degree of purity of at least 85%, especially at least 90%, i.e. such that at least 80% or 90% of the silicate-based particles consist of the zeolite.

The particles are added to the (carboxylated) diene elastomer latex. Thereby these particles are bound or embedded in the layer of the elastomer latex, i.e. in such a way that the particles are physically and/or mechanically bound. Particles close to the surface (relative to the layer of the (carboxylated) diene elastomer) may project beyond the elastomer layer, wherein at least 90%, especially 100% of these particles are likewise coated with the elastomer of the elastomer layer in this case. Thus it is possible to create a surface roughness, which may improve the gripping ability of the glove or may improve the composite strength of the elastomer layer with a further layer, because a mechanical anchoring of the particles in the further layer can be additionally achieved.

The projection of the particles beyond the surface of the elastomer layer may be achieved and adjusted via the particle size of the particles and/or the layer thickness of the elastomer layer.

The particles may have a particle size that corresponds to a particle-size distribution with a mean particle diameter ($d_{50}$) of 0.5 μm to 7.5 μm with a top cut ($d_{98}$) of 2 μm to 20 μm.

The sizes of the natural zeolite particles were determined with a Malvern Mastersizer, Hydro 2000G (wet cell). The particle sizes of the synthetic zeolites as well as of the silicate particles were taken from the data sheet of the manufacturers.

Particles used for the following examples:

Zeolite 1: natural zeolite; $d_{10}=2$ μm; $d_{50}=5$ μm; $d_{98}=15$ μm (BET: 33.2 m$^2$/g).

Zeolite 2: natural zeolite; $d_{10}=1.7$ μm; $d_{50}=3$ μm; $d_{98}=8.5$ μm.

Zeolite 3: natural zeolite; $d_{10}=0.3$ μm; $d_{50}=1.4$ μm; $d_{98}=5.5$ μm.

Zeolite 4: synthetic zeolite; rod-shaped: 300×700 nm (BET: 300 m$^2$/g).

Silica 1: amorphous silica (Sigma-Aldrich): 0.2-0.3 μm (aggregates) (BET: 200 m$^2$/g).

Silica 2: silica with the designation KS 400 of the Grace Co., BET=180 m$^2$/g.

Rima Sil 1200: Ca silicate ($CaSiO_3$), $d_{50}=2$ μm.

The layer thickness of the elastomer layer may amount to between 30 μm and 500 μm.

In principle, the particles may have any habit. Preferably, however, particles are used that are at least approximately round or rounded, i.e. do not have any sharp broken edges.

Preferably the particles are contained in the elastomer layer in a proportion by mass of 1 phr (parts per hundred rubber) up to 20 phr, especially from 3 phr to 10 phr.

According to a further embodiment variant, the particles may preferably have a specific BET surface between 1 g/m$^2$ and 300 g/m$^2$. The mechanical properties may therefore be improved due to the interactions of the particles with the elastomer matrix. In addition, more covalent bonds may be formed in this way on the surface of the particles.

For modification of the particles, it is possible to use cross-linking agents that are selected from a group consisting of or comprising (multifunctional) epoxides, (multifunctional) silanes, dialkoxysilanes, trialkoxysilanes, trichlorosilanes. Examples of these are (3-glycidoxypropyl) trimethoxysilane, polyglycidoxypropyltrimethoxysilane, (3-glycidoxypropyl) triethoxysilane, (3-glycidoxypropyl) trichlorosilane, 2-(3,4-epoxycyclohexyl) ethyltriethoxysilane, 2-(3,4-epoxycyclohexyl) ethyltrimethoxysilane, 5,6-epoxyhexyltriethoxysilane, (3-glycidoxypropyl) methyldiethoxysilane, (3-glycidoxypropyl) methyldimethoxysilane.

The particles are usually surface-modified. However, if particles having voids are used, such as zeolites, for example, the modification may also comprise the surface of the voids.

The particles are preferable modified with an excess of cross-linking agent for formation of a multiple-layer structure of the cross-linking agent on the particles. However, it is also possible to use a smaller quantity of cross-linking agent for the purpose, so that the cross-linking agent is present in deficiency relative to the surface to be modified, i.e. relative to the reactive groups to be modified on the surface of the particles.

The modification may be carried out as described in the following. However, it is also possible to use already modified particles. Such particles are obtainable from, for example Grolman (Rima Sil 1200 on Ca silicate basis), EM Hoffmann Minerals (Aktisil EM), Quarzwerke (Tremin 283-400EST).

As already stated in the foregoing, it is also possible to use, in addition to the particles to be modified, a further cross-linking agent in the form of multifunctional monomers and/or multifunctional polymers that are soluble or dispersible or emulsifiable in the (carboxylated) diene elastomer latex. In this connection, the term "polymer" in the sense of this description generally comprises molecules with two or more monomer units, i.e. molecules from dimers up. The multifunctional monomers and/or polymers are preferably selected from a group comprising or consisting of multifunctional epoxide(s), multifunctional silane(s), multifunctional siloxane(s), multifunctional thiol(s), as well as mixtures thereof.

Examples of these are short-chain: sorbitol polyglycidyl ether, glycerol glycidyl ether, 1,6-hexanediol diglycidyl ether, resorcinol diglycidyl ether, 1,4-cyclohexanedimethanol diglycidyl ether, diglycidyl 1,2-cyclohexanedicarboxylate, ethylene glycol diglycidyl ether; long-chain: diepoxy-terminated polyethylene glycol, diepoxy-terminated polypropylene glycol, polyglycidyl methacrylate (homopolymers and copolymers with ethylene glycol units, ethylene units, etc.), polyglycerine polyglycide ether.

Short-chain compounds are monomeric, high-molecular, multifunctional compounds, especially such compounds with a molar mass of at least 170 g/mol. Long-chain compounds have at least two or more repeat units (dimers and higher).

Within the scope of the invention, the term "polymer" generally also comprises oligomers.

In general, the term "high-molecular" monomer describes a monomer that has a molar mass of preferably at least 170 g/mol, especially between 170 g/mol and 4000 g/mol.

It is further of advantage when the pH of the (carboxylated) diene elastomer latex is adjusted to a value of greater than/equal to 9. As an example, an aqueous KOH solution (1 wt % to 5 wt %) may be used for this purpose. In general, suitable basic substances, such as lyes, may be used for this purpose.

In the preferred embodiment variant of the method, the cross-linking of the (carboxylated) diene elastomer molecules is carried out thermally, especially during the drying of the (dipping-applied) layer of the (carboxylated) diene elastomer latex. In the process, the temperature may be between 90° C. and 140° C. The cross-linking may take place during a time span between 5 minutes and 20 minutes.

It is possible to use a cross-linking agent that has a molar mass between 170 g/mol and 4000 g/mol, especially between 170 g/mol and 1700 g/mol (polymeric, water-soluble compounds according to DIN 55672-3:2007-08 (GPC)) or, via the viscosity of liquid polymers, according to DIN 51 562-1). For example, it is possible to use ethylene glycol diglycidyl ether (molar mass 170 g/mol) or diethylene glycol diglycidyl ether (molar mass 218 g/mol). In this way it is also possible to adjust the (50%) modulus of the elastomer glove to a desired value. The modulus of the elastomer glove may be adjusted via the chain length of the cross-linking agent.

With the method, it is possible to manufacture a prophylactic article, especially glove, comprising a layer of a (carboxylated) diene elastomer, wherein the (carboxylated) diene elastomer molecular chains of the (carboxylated) diene elastomer are cross-linked covalently via organic molecules and if applicable ionically via metal cations, wherein the metal cations in particular are part of inorganic particles, and wherein the organic molecules are immobilized on the inorganic particles.

The elastomer gloves manufactured according to the method exhibit a good skin tolerability. On the basis of conducted investigations, no skin irritation and no sensitization potential have been observed.

In the course of the testing of the cross-linking method, the following experiments among others were conducted. These are merely selected examples, since the reproduction of all experiments would go beyond the scope of this description.

The materials used in the experiments on the use of modified particles (fillers) are summarized in the following Table 1.

TABLE 1

Materials used for the cross-linking with modified particles.

| Name | Function | Description |
|---|---|---|
| Nipol LX556 ZEON Corporation (JPN) | Latex | <br>XNBR<br>Dry rubber content: 45.2%<br>pH: 8 to 8.8 |
| (3-Glycidoxypropyl) trimethoxysilane Wacker | Singly functional epoxide for particle modification | 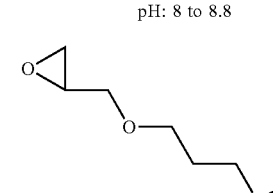 |

TABLE 1-continued

Materials used for the cross-linking with modified particles.

| Name | Function | Description |
|---|---|---|
| CoatOSil MP 20 Momentive | Triply functional epoxide for particle modification | 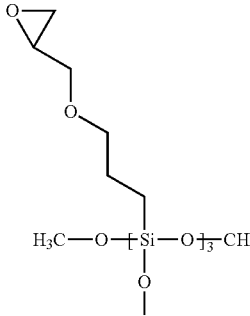 |
| Rima Sil 1200 Grolman Group (GER) | Cross-linker | 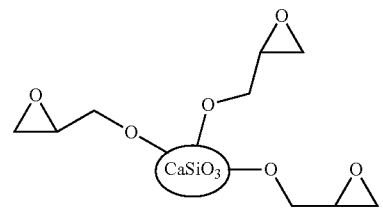<br>Triply epoxy-functional silane on calcium silicate carrier (silane proportion at the surface ~50%) |
| Inzeo mono 15_5 zeolite Paltentaler Minerals | Cross-linker | 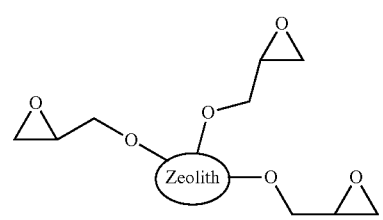<br>Triply epoxy-functional silane on zeolite carrier (silane proportion at the surface ~50%) |
| Inzeo mono 15_5 zeolite Paltentaler Minerals | Cross-linker | 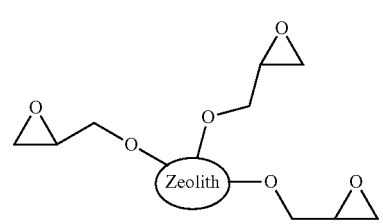<br>Singly epoxy-functional silane on zeolite carrier (silane proportion at the surface ~50%) |

The epoxy-functionalized particles were pre-dispersed in different concentration (3 to 7.5 phr) in deionized water with an Ultra Turrax (10 min at room temperature) and then added to the latex mixture (pH=10, ~25 drc (dry rubber content)).

In general, the (carboxylated) diene elastomer latex can have a solids content of (carboxylated) diene elastomer between 10 drc (dry rubber content) and 60 drc.

The mixture was doped with an antioxidant (0.5 phr Ralox) and stirred at room temperature for approximately 15 min. Then the films were prepared by means of the coagulant dipping method mentioned in the foregoing. In the process, the latex mixture was stirred gently by means of a magnetic stirrer during the dipping process, in order to prevent sedimentation of the particles.

The stirring of the latex mixture is preferably used in general during the method.

The films were dried at 100° C. for 15 min. No preliminary cross-linking or latex maturing was needed, since the cross-linking took place during the drying of the films at 100° C.

The following reaction is the basis of the thermal cross-linking with epoxy-functional inorganic particles as cross-linking agents. The adjustment of the pH of the latex mixture with 1 wt % KOH to pH=10 to 10.5 in advance is preferable, since the reaction is catalyzed at higher pH values.

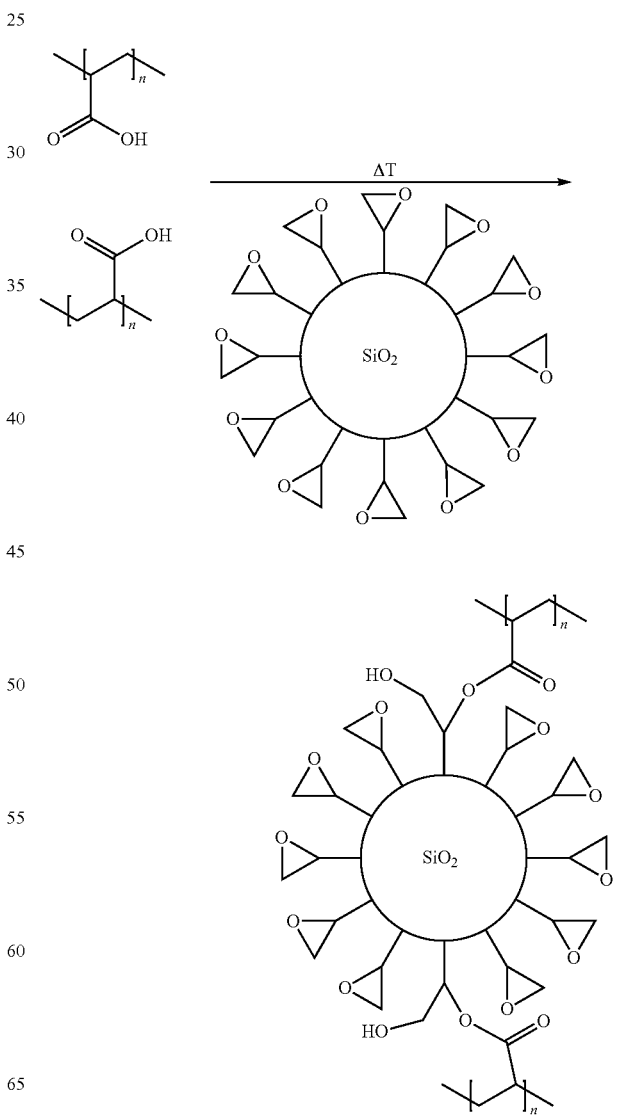

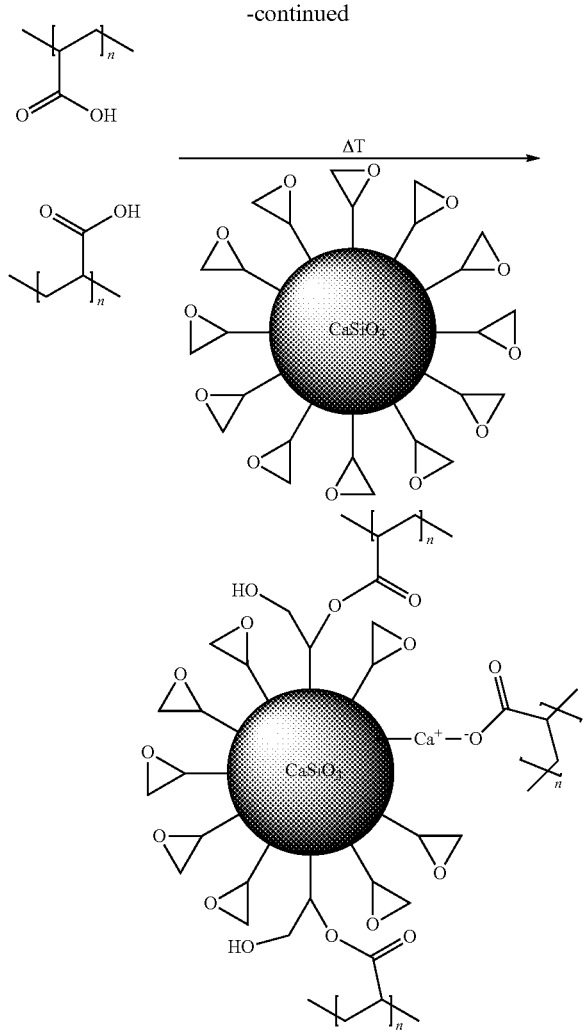

The successful cross-linking of XNBR latex during use of functional inorganic particles as non-extractable cross-linking agents was demonstrated in the first step by means of equilibrium swelling in chloroform (determined according to: (1) Macromolecules 2008, 41, 4717-4729, (2) J. Appl. Polym. Sci. 129(5), 2735-2743 and (3) Zaborski, M.; Kosmalska, A.; Gulinski, J. Kautsch. Gummi Kunstst. 2005, 58, 354). The results are plotted in FIG. 1 (abscissa: Concentration of cross-linking agent in phr; ordinate: Degree of swelling), and show that the degree of cross-linking correlates with the concentration of the cross-linking agent and higher cross-linker concentrations lead to higher cross-linking densities.

Preferably, therefore, a concentration of cross-linking agent between 1 phr and 15 phr, especially between 1 phr and 7.5 phr, is used.

Figure 2:
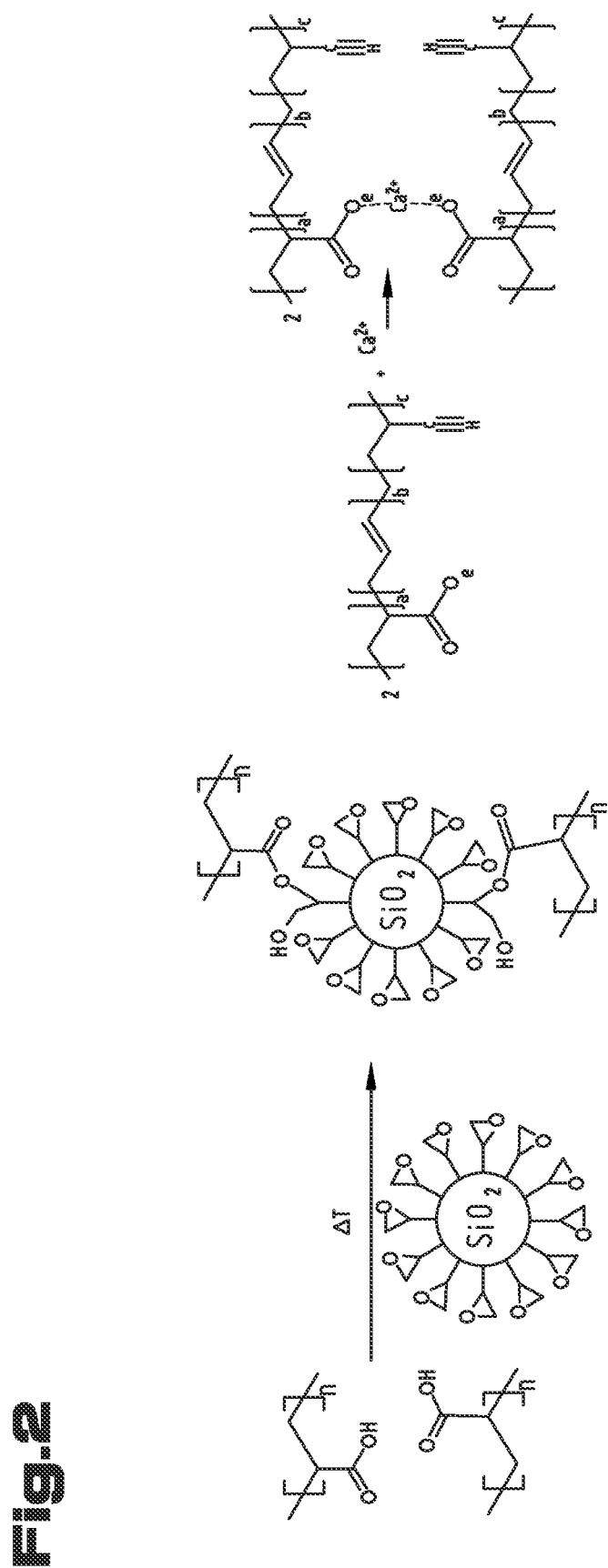
FIG. 2 shows diagram of the covalent (left) and of the ionic (right) cross-linking of XNBR.

Besides the low extractability, the advantage of the epoxy-functional particles on the basis of Ca silicates is derived from the fact that covalent as well as ionic cross-linking sites can be formed with one cross-linking agent, as is illustrated in FIG. 2 (covalent bonds at left, ionic bonds at right). Due to this combined approach, the possibility also exists of manufacturing gloves free of heavy metals (free of ZnO).

Figure 3:
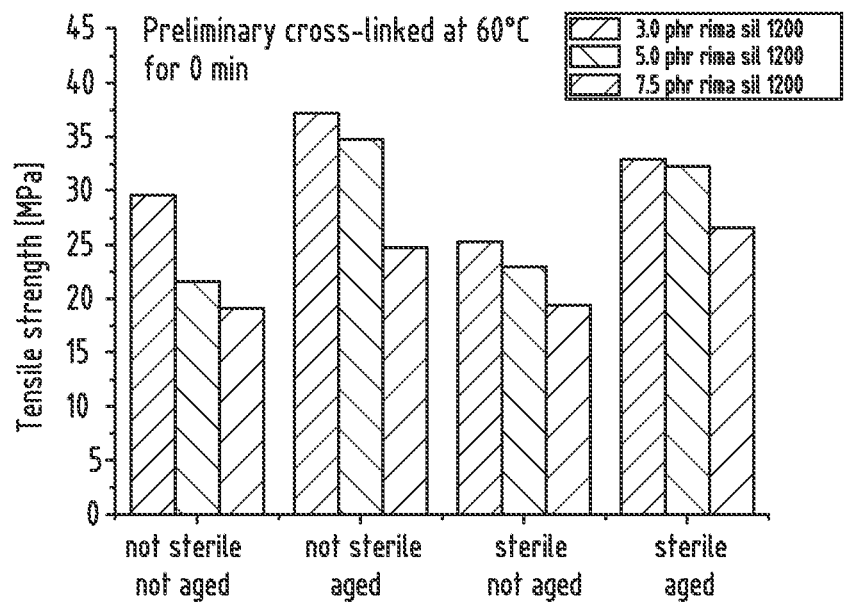
FIG. 3 shows tear strengths of cross-linked XNBR latex films at different Rima Sil 1200 concentrations (no preliminary cross-linking; thermal cross-linking in the course of drying at 100° C. for 15 min)

FIG. 3 shows the tear strength (ordinate in MPa) in dependence on the particle quantity used. From left to right on its abscissa, the bars are plotted respectively in groups of three for 3 phr, 5 phr and 7.5 phr particles for non-sterile and non-aged, non-sterile and aged, sterile and non-aged as well as sterile and aged samples.

In general, the sterilization can be carried out by gamma irradiation with a Co-60 source and an irradiation dose of 25 kGy. The aging may generally be carried out by hot-air aging at 70° C. for 7 days in the circulating-air oven.

As is apparent from FIG. 3, the best tear strengths were achieved with 3 phr particles, wherein the cross-linked XNBR latex films are characterized by a good aging resistance and gamma resistance.

Figure 4:
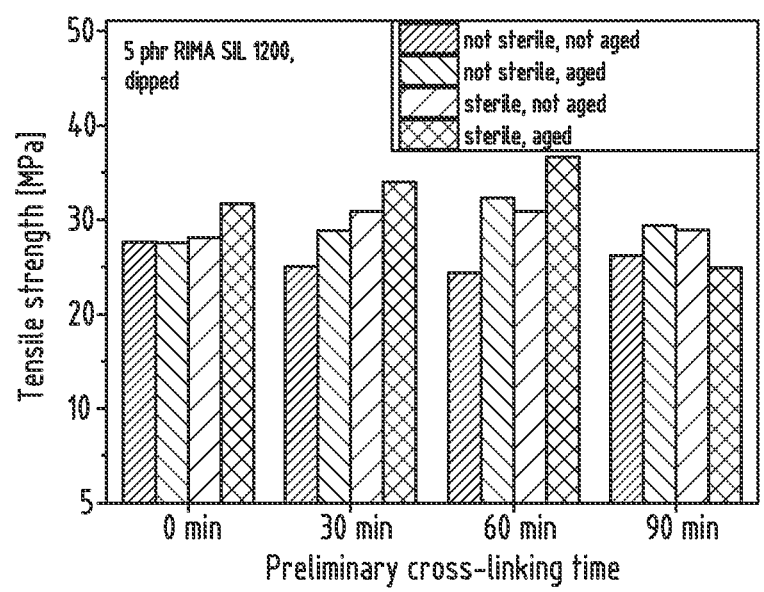
FIG. 4 shows tensile strengths of XNBR latex films for different prevulcanization times and for use of 5 phr Rima Sil 1200.

Subsequently, the influence of a pre-vulcanization on the mechanical properties was investigated. The corresponding values for this are plotted in FIG. 4. In each case, the proportion of particles was 5 phr. The tensile strengths (determined according to ASTM Standard D412-98a, "Standard Test Methods for Vulcanized Rubber and Thermoplastic Elastomers-Tension," Annu. Book ASTM Stand. Sep. 1, 2002)) are plotted in MPa on the ordinate. From left to right, the bars within a group of four stand for non-sterile and non-aged, non-sterile and aged, sterile and non-aged as well as sterile and aged samples. The preliminary cross-linking times are indicated in minutes on the abscissa.

Analogously to the cross-linking with water-soluble polymeric cross-linking agents, no improvement of the mechanical properties is observed due to a thermal preliminary cross-linking (1 to 3 h at temperatures in the range of 50–60° C.)

Figure 5:
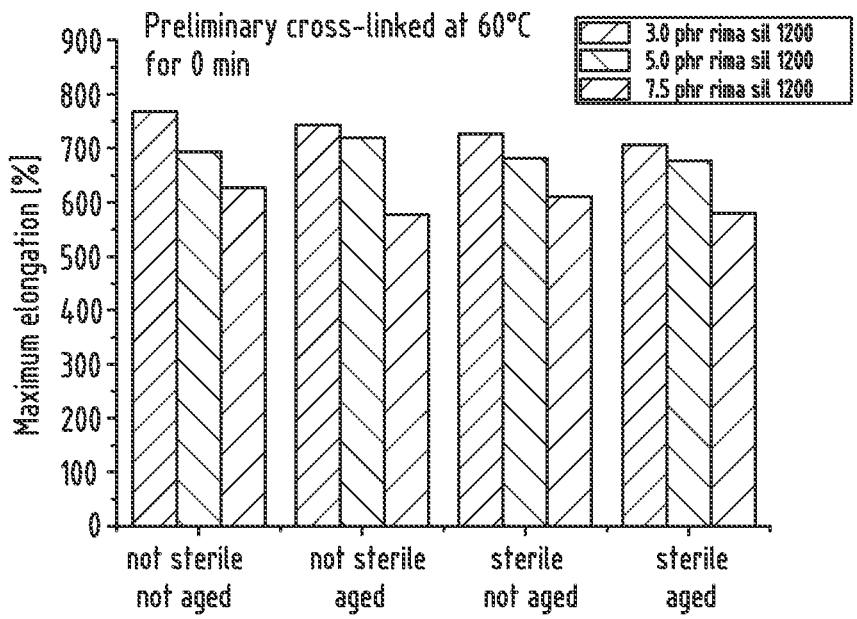
FIG. 5 shows elongations at break of cross-linked XNBR latex films at different Rima Sil 1200 concentrations (no preliminary cross-linking; thermal cross-linking in the course of drying at 100° C. for 15 min)
Figure 6:
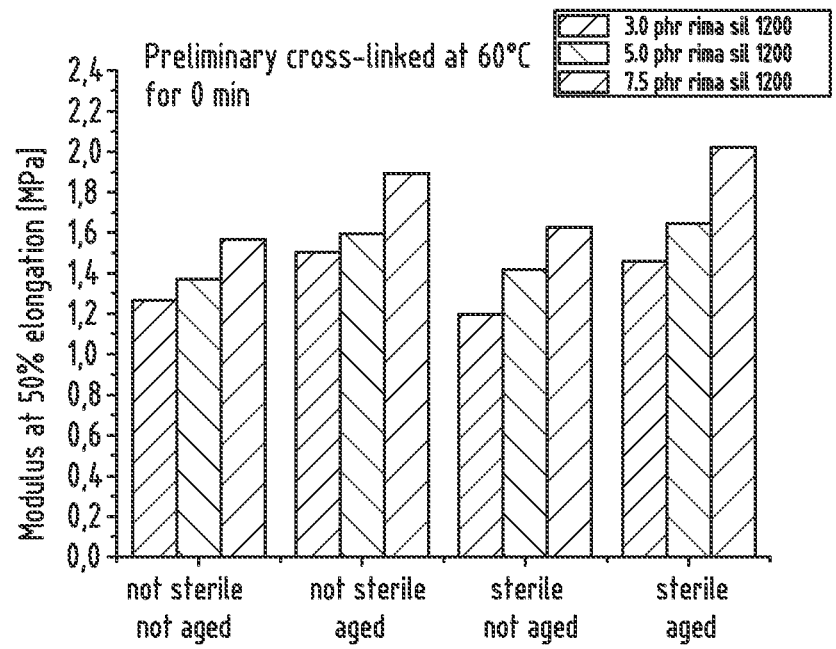
FIG. 6 shows stress values at 50% elongation of cross-linked XNBR latex films at different Rima Sil 1200 concentrations (no preliminary cross-linking; thermal cross-linking in the course of drying at 100° C. for 15 min)

The results of the elongation measurements are plotted in FIG. 5 and the results of the modulus measurements in FIG. 6. The corresponding values may be read respectively on the ordinate. The subdivisions on the abscissa correspond to those of FIG. 3.

For cross-linker concentrations in the range of 3 to 5 phr, the elongations at break are consistently above 700% and the corresponding stress values at 50% elongation lie in the range of 1.2 to 1.6 MPa.

Experiments were also undertaken in which the silane components of the surface functionalization were introduced directly and without particles into the latex mixture. In the process, only low degrees of cross-linking and poorer mechanical properties were measured. This was demonstrated on the basis of experiments with CoatOSil MP200, which was applied as an organic sheath onto the Rima Sil particles. The results of the tension test show that the tear strengths lie below 20 MPa regardless of the silane concentration. A thermal preliminary cross-linking of the latex mixtures at 60° C. leads to an additional decrease of the strengths to lower than 10 MPa. This is possibly due to a condensation of the silanes to oligosilicas, and it shows that the particles have a special function for high mechanical strengths of the elastomer film.

In order to show the applicability of this of the method even with further filler types, zeolites were modified with functional silanes. In this case, detailed investigations have shown that the functionalization of zeolites and silicas is possible by the condensation reaction with trialkoxysilanes. Degrees of modification up to 5 wt % were achieved for zeolites and 6 wt % for silicate particles (relative to the inorganic carrier) (detected by means of thermogravimetry). Here also, it was observed that the epoxy groups are at least partly hydrolyzed in the course of the modification, and thereby the reduced reactivity occurs (this was shown by means of spectroscopic methods and correlation with the corresponding mechanical properties). For this reason, it is of advantage, as described in the foregoing, to use coated particles, i.e. particles in which the first course is indeed bound chemically on the particle surface and hydrolyzed, but a multiple-layer system that contains non-hydrolyzed anchor groups is formed with silane excess. The improved cross-linking with Rima Sil 1200 particles described in the foregoing is also based on this principle, since the Ca silicates have been functionalized with a distinct excess of silane and the organosilane sheath can already be regarded as a coating.

Figure 7:
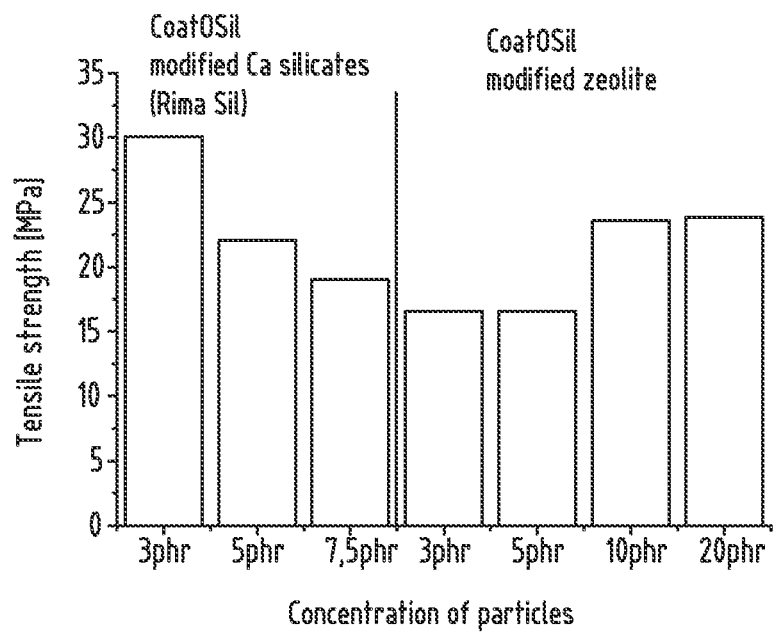
FIG. 7 shows tear strengths of XNBR latex films for different particle types and particle concentrations.
Figure 8:
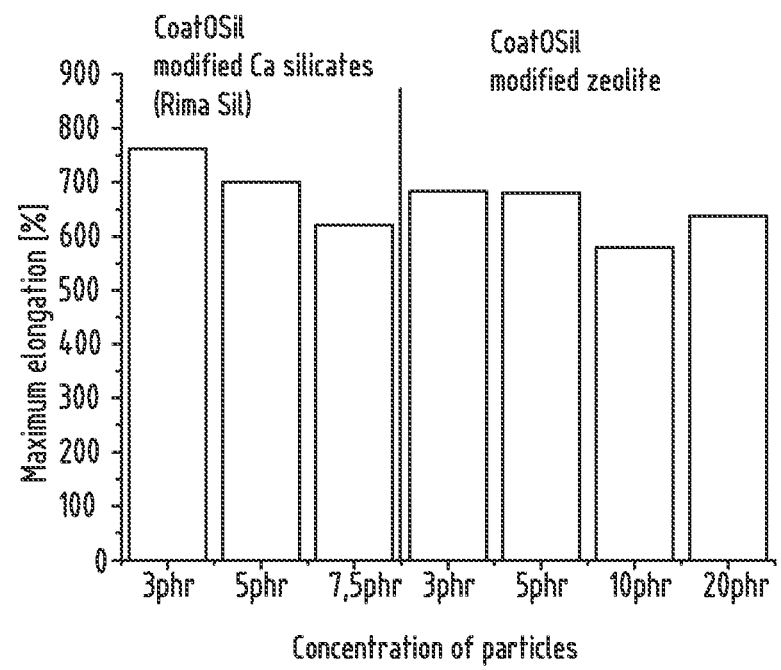
FIG. 8 shows elongations at break of XNBR latex films for different particle types and particle concentrations.

Based on these investigations, zeolites and silicas were modified with an excess of silane and used as cross-linking agents for the thermal cross-linking of XNBR latex. For modification, zeolite suspensions (zeolite 1 to 4) in ethanol with a concentration of 100% (w/v) were prepared in a first step and then 50% (w/v) 3-glycidoxypropyltrimethoxysilane or 50% (w/v) CoatOSil MP200 was added. The suspensions are mixed with a magnetic stirrer for one hour at room temperature and then the particles are dried for 2 h at 120° C. (removal of the solvent). The results are plotted in FIGS. 7 to 8.

Figure 9:
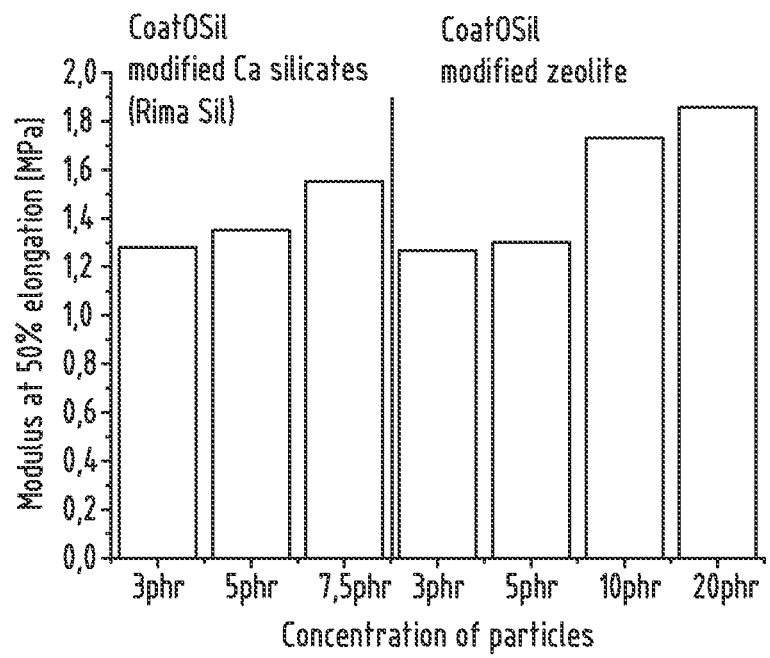
FIG. 9 shows stress values at 50% elongation of XNBR latex films for different particle types and particle concentrations.

In these FIGS., Ca silicates (left, next to the vertical line) modified respectively with CoatOSil are compared with the correspondingly modified zeolites (right, next to the vertical line). The tear strength in MPa is plotted on the ordinate in FIG. 7, the elongation in MPa in FIG. 8 and the modulus at 50% elongation in FIG. 9. The quantitative proportions of particles in the latex are plotted in phr on the abscissas.

In the course of the studies, the influence of the particle size on the mechanical properties was also investigated. For the coated zeolite particles being used, no significant influence of the particle size was observed. The tear strengths of cross-linked XNBR latex films with addition of 10 phr zeolite particles, modified with CoatOSil MP200 (no preliminary cross-linking; thermal cross-linking in the course of drying at 100° C. for 15 min) were consistently between 22 MPa and 25 MPa.

With amorphous silicas and Ca silicates (Rima Sil), it is possible to achieve higher mechanical strengths at lower cross-linker concentrations (5 phr). The tear strengths of cross-linked XNBR latex films with addition of 5 phr particles, modified with CoatOSil MP200 (no preliminary cross-linking; thermal cross-linking in the course of drying at 100° C. for 15 min) were approximately 30% higher than those of the investigated zeolites, thus permitting the influence of the particle material to be inferred.

Figure 10:
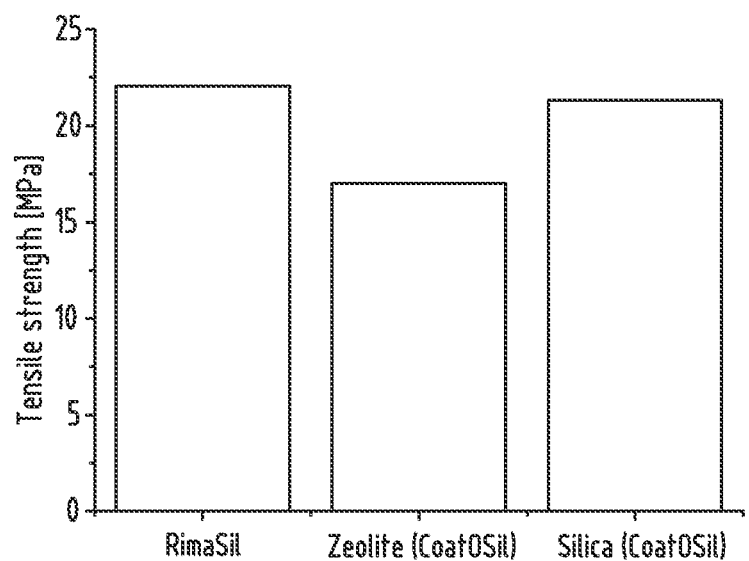
FIG. 10 shows tear strengths of XNBR latex films for different particle types and particle concentrations (cross-linker concentration: 5 phr).

Analogously to the modification of zeolites, silica particles (silicate 1, silicate 2, silica with the designation KS 400 of the Grace Co.) were coated by means of CoatOSil MP200 in a manner corresponding to the foregoing modification procedure. The mechanical properties of the corresponding XNBR latex films (no preliminary cross-linking; thermal cross-linking during drying at 100° C.) are comparable with the results of the Rima Sil particles. At 5 phr, somewhat lower tear strengths are observed during use of the modified zeolite particles (FIG. 10; ordinate: tear strength in MPa, abscissa from left to right: Rima Sil, zeolite, silica), which can be attributed with high probability to the porous filler structure (and the associated elongated migration pathways of the non-covalently bound epoxy cross-linking agent).

In a further experiment, the thermal cross-linking of XNBR latex was performed with commercially available epoxy-functional siliceous earths of Hoffmann Minerals. The degree of modification of these particles (Aktisil EM) is much lower than for the Rima Sil 1200 particles, while the particle sizes fall within a similar range, as is apparent from the following table 2.

TABLE 2

|  | RimasilSil 1200 | Aktisil EM |
|---|---|---|
| Manufacturer | Grolman | Hoffmann Minerals |
| $d_{50}$ [µm] | 2 | 2.2 |
| Inorganic carrier | Ca silicate ($CaSiO_3$) | Siliceous earth |
| Organic sheath | "high" (~20-%) | "low" (~2%) |

The mechanical strengths of the cross-linked XNBR latex films lie in the range of the non-cross-linked reference (non-cross-linked dipped and dried XNBR latex without addition of any cross-linking chemicals and fillers, pH of the latex mixture was adjusted to 10) and suggest an inadequate cross-linking. The results confirm the influence of the degree of modification of the functionalized particles on the cross-linking density and associated therewith the mechanical properties of the cross-linked XNBR latex films. It was found that a degree of modification of the particles, measured by means of thermogravimetric analysis (TGA) of at least 2%, especially between 4% and 60%, is of advantage.

In the following, the experimental results are presented for the performance of the method with multifunctional monomers and/or polymers as a further cross-linking agent. The reagents used for this purpose are summarized in Table 3.

TABLE 3

Materials used for the cross-linking with monomers and/or polymers

| Name | Function | Description |
|---|---|---|
| Nipol LX556 ZEON Corporation (JPN) BST8502N PolyLac 582N | Latex | HO, O, N structure<br><br>XNBR<br>Dry rubber content:<br>45.2%<br>pH: 8 to 8.8 |

TABLE 3-continued

Materials used for the cross-linking with monomers and/or polymers

| Name | Function | Description |
| --- | --- | --- |
| SPE, sorbitol polyglycidyl ether CVC Thermo-set Specialities | Polymeric cross-linking agent | 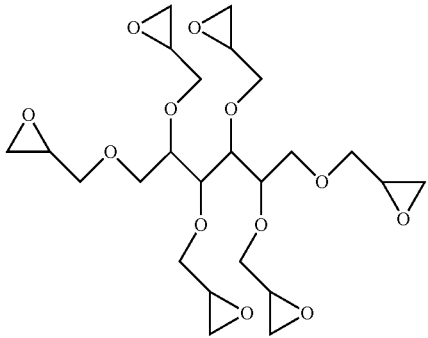 [SMILES: C(OCC(OCC1CO1)C(OCC1CO1)C(OCC1CO1)C(COCC1CO1)OCC1CO1)C1CO1]<br>Sorbitol polyglycidyl ether (ERISYS GE 60) |
| GE100 Raschig | Polymeric cross-linking agent | 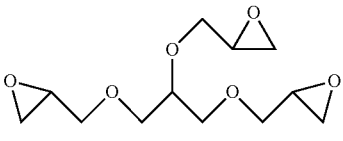 [SMILES: C(OCC1CO1)C(COCC1CO1)OCC1CO1]<br>Glycerol glycidyl ether |
| DEPEG Sigma-Aldrich (USA) PolyScience (USA) | Polymeric cross-linking agent | 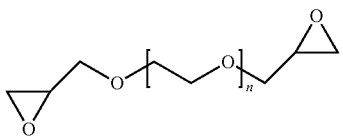<br>Diepoxy-terminated polyethylene glycol<br>DEPEG-200 Mn = 200<br>DEPEG-500 Mn = 500<br>DEPEG-1000 Mn = 1000 |

Preparation of the Latex Mixtures, Dipping and Cross-Linking

The water-soluble cross-linking agent was added in different concentration (0.5 to 7.5 phr) to the latex mixture (pH=10, ~25 drc), which contains modified particles corresponding to the foregoing descriptions. The mixture was then doped with an antioxidant (2 phr Ralox) and stirred at room temperature for approximately 15 min. Then the films were prepared by means of the coagulant dipping method described in the foregoing and the films were dried at 100° C. for 15 min. No preliminary cross-linking or latex maturing was needed. The cross-linking took place during the drying of the films at 100° C.

The following reactions constitute the basis of the thermal cross-linking with monomeric and/or polymeric epoxy cross-linkers. The adjustment of the pH of the latex mixture in advance is of advantage, for example with 1 wt % KOH to pH=10, since the reaction is catalyzed at higher pH values.

Reaction of a Carboxylated Elastomer with an Epoxide

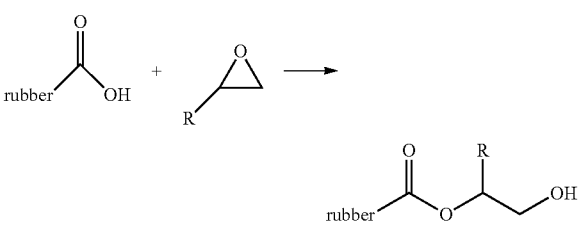

Acid-Catalyzed and Base-Catalyzed Ring Opening of Epoxides.

(5)

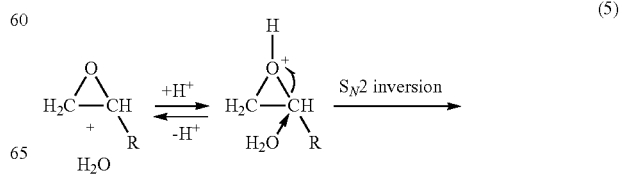

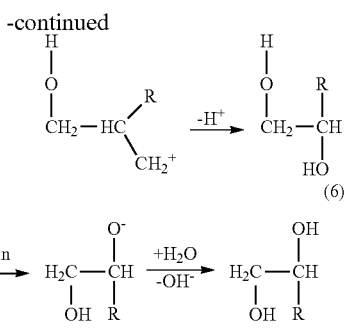

The successful cross-linking of XNBR latex by addition of selected water-soluble polymeric cross-linking agents was demonstrated by means of equilibrium swelling in chloroform (see foregoing for measurement basis). In this case, the cross-linking density becomes greater with increasing cross-linking time and cross-linking agent concentration, wherein the reactivity of the cross-linking agents increases in the order DEPEG-500<SPE<GE100.

Besides the equilibrium swelling, the cross-linking of XNBR latex by addition of selected water-soluble monomeric and polymeric cross-linking agents was also demonstrated by means of tension testing.

During use of DEPEG-500, mechanical strengths in the range of 22±2 MPa were observed at a concentration of 5 phr and higher. At lower concentrations (0.5 to 3 phr), a low cross-linking density was achieved and the tear strengths lie below 10 MPa. An increase of the cross-linker concentration to 7.5 phr causes a further increase of the strengths of up to 35±2 MPa. Therefore a concentration of 5 phr to 7.5 phr is preferred.

Very good mechanical strengths and aging resistances and gamma resistances were also observed with DEPEG-200 in a concentration range between 3 phr and 7.5 phr (non-sterile/non-aged: 26 MPa-40 MPa; non-sterile/aged: 37 MPa-26 MPa; sterile/non-aged: 28 MPa-24 MPa; sterile/aged: 25 MPa-35 MPa).

Since similar results were also achieved with other multifunctional monomeric and polymeric cross-linking agents, a concentration of 1 phr to 7.5 phr multifunctional monomeric and/or polymeric cross-linking agents in the latex is generally preferred.

Furthermore, an excellent hot-air aging resistance (7 days of storage at 70° C.) and gamma resistance (25 kGy) is observed.

In addition, the stress value at 50% elongation lies in the range of 1.2 to 1.4 MPa even for high tear strengths and, especially during use of 5 phr cross-linking agent, is hardly increased even after hot-air aging and gamma sterilization. This is of advantage most of all for the manufacture of surgical gloves, since a low stress value at 50% elongation is a criterion for a pleasant wearing comfort.

Analogously to the cross-linking with DEPEG-500, very good mechanical properties (even after gamma sterilization) were also demonstrated for use of SPE (sorbitol polyglycidyl ether) at higher concentrations (7.5 phr). At a concentration of 5 phr SPE, values between 12 MPa and 32 MPa were measured for the mechanical properties (non-sterile/non-aged: 30 MPa-32 MPa; non-sterile/aged: 12 MPa-14 MPa; sterile/non-aged: 30 MPa-32 MPa; sterile/aged: 13 MPa-15 MPa).

Disadvantageously, however, a poorer aging resistance of the cross-linked XNBR latex films is evident. After a storage at 70° C. for 7 days, the strengths decrease from 30±2 MPa to less than 15 MPa.

During use of SPE as a water-soluble high-molecular cross-linking agent, a pronounced increase of the stress value at 50% elongation is additionally observed, which is detrimental for the wearing comfort of the elastomer glove. At 7.5 phr SPE, values in the range of 1.6 to 1.8 MPa are obtained.

During use of GE100 as the cross-linking agent, very good mechanical strengths, which lie in the range of 20 to 27 MPa, are already obtained at low concentrations (1 and 3 phr). With higher cross-linking agent concentrations (7.5 phr), a further increase of the tear strengths is observed (37±2 MPa). At a concentration of 5 phr, values between 22 MPa and 40 MPa were obtained (non-sterile/non-aged: 35 MPa-40 MPa; non-sterile/aged: 32 MPa-35 MPa; sterile/non-aged: 36 MPa-38 MPa; sterile/aged: 22 MPa-23 MPa). The cross-linked XNBR latex films are characterized by a very good gamma resistance. The low aging resistance, which leads to a decrease of the tear strengths at low cross-linking agent concentrations in particular, proves to be disadvantageous.

In summary, it may be concluded from the results that high tear strengths (30±2 MPa) and gamma resistances (after gamma sterilization: 30±2 MPa) were obtained with all three investigated cross-linking agents. As regards resistance to a hot-air aging or a low modulus at 50% elongation, DEPEG-500 exhibits clear advantages compared with GE-100 and SPE.

Based on these results, the modulus value of the cross-linked XNBR latex films was selectively adjusted in further investigations via the molar mass of the epoxy-terminated polyethylene glycol derivative (DEPEG). With low molar mass, a very high strength (up to 40 MPa) is obtained on the one hand, while the modulus increases. This is interesting above all for the manufacture of examination gloves, where high strengths are the main concern and the modulus (on the basis of the layer thickness) plays only a subordinate role. For XNBR films that were cross-linked with DEPEG-500 (mean molar mass), somewhat lower strengths are indeed obtained, but the modulus values are substantially lower. This variant is suitable more for the manufacture of examination gloves, where the main focus lies on a low modulus.

However, if the molar mass of the cross-linking agent lies in the range of 1,000 g/mol, the 50% modulus value can indeed by brought below 1 MPa, but the corresponding tear strengths also lie below 15 MPa. The results therefore show that a balance between tear strength and modulus may be adjusted via the chain length of the cross-linking agent. The chain lengths of the polymeric cross-linking agents mentioned in the foregoing are therefore preferred.

In further investigations, PolyLac 582N as a further alternative latex type was cross-linked with 5 phr DEPEG-200 at different pH values. The results show clearly that a successful cross-linking of PolyLac 582N is possible.

Furthermore, cross-linkings were performed with a mixture consisting of epoxy-modified particles and high-molecular epoxy cross-linkers. For this purpose, epoxy-functionalized particles (RimaSil 1200) were pre-dispersed in different concentration (1.5 to 5 phr) in deionized water with an ULTRA TURRAX (10 min at room temperature) and then added to the latex mixture (pH=10.2; ~25 drc). Then a water-soluble high molecular multifunctional epoxide (diepoxy-terminated polyethylene glycol, DEPEG-200) was added in different concentrations (1.5 to 5 phr) and the mixture was doped with an antioxidant (2 phr Ionol LC). The mixtures were stirred for approximately 15 minutes at room temperature. Then the films were prepared by means of coagulant dipping methods (see foregoing descriptions in this respect), wherein the latex mixture was stirred gently by means of a magnetic stirrer during the dipping process, in order to prevent sedimentation of the particles. The films are dried at 100° C. for 15 minutes. No preliminary cross-linking or latex maturing was needed, since the cross-linking took place during the drying of the films at 100° C. The adjustment of the pH of the latex mixture with 1 wt % KOH to pH=10.2 is also of advantage here, since the reaction is catalyzed at higher pH values.

Of the prepared XNBR latex films (non-sterile, non-aged), the tear strengths were approximately 31 MPa for 1.5 phr DEPEG-200 and 1.5 phr Rima Sil 1200, approximately 28 MPa for 2.5 phr DEPEG-200 and 2.5 phr Rima Sil 1200, approximately 33.5 MPa for 5 phr DEPEG-200 and 2.5 phr Rima Sil 1200, approximately 25 MPa for 3.75 phr DEPEG-200 and 3.75 phr Rima Sil 1200 and approximately 30 MPa for 2.5 phr DEPEG-200 and 5 phr Rima Sil 1200.

The results of the tension test show that cross-linking agent mixtures consisting of a functional filler and a high-molecular, multifunctional epoxide also lead to very good mechanical strengths. Especially at low cross-linking agent concentrations, the combination of the selected cross-linking agents leads to high tear strengths.

The modulus of these latex films at 50% elongation was approximately 1.35 MPa for 1.5 phr DEPEG-200 and 1.5 phr Rima Sil 1200, approximately 1.45 MPa for 2.5 phr DEPEG-200 and 2.5 phr Rima Sil 1200, approximately 1.4 MPa for 5 phr DEPEG-200 and 2.5 phr Rima Sil 1200, approximately 1.35 MPa for 3.75 phr DEPEG-200 and 3.75 phr Rima Sil 1200 and approximately 1.6 MPa for 2.5 phr DEPEG-200 and 5 phr Rima Sil 1200.

The elongation of these latex films was approximately 700% for 1.5 phr DEPEG-200 and 1.5 phr Rima Sil 1200, approximately 650% for 2.5 phr DEPEG-200 and 2.5 phr Rima Sil 1200, approximately 660% for 5 phr DEPEG-200 and 2.5 phr Rima Sil 1200, approximately 620% for 3.75 phr DEPEG-200 and 3.75 phr Rima Sil 1200 and approximately 620% for 2.5 phr DEPEG-200 and 5 phr Rima Sil 1200.

In further experiments, the separate addition of trialkoxysilane and zeolite (unmodified) was investigated. For this purpose, 5 phr unmodified zeolite particles (mono inzeo 15/5) were pre-dispersed in deionized water with an ULTRA TURRAX (10 min at room temperature) and then added to the latex mixture (pH=10.2; ~25 drc) (adjustment of the pH of the latex mixture with 1 wt % KOH to pH=10.2). In a second step, the trialkoxysilane CoatOSil MP 200 was added with a concentration of 2.5 phr to the mixture (Note: concentration of the silane was matched to the concentration of the modified particles, so that the concentration of the silane in the total mixture is equally high in both cases—separate addition and addition of modified particles). The mixture was then doped with an antioxidant (0.5 phr Ionol LC) and stirred at room temperature for approximately 15 minutes. The films were prepared by means of coagulant dipping methods (see foregoing), wherein the latex mixture is stirred gently by means of a magnetic stirrer during the dipping process, in order to prevent sedimentation of the particles. The films are dried at 100° C. for 15 minutes.

The tear strengths of the XNBR latex films (non-sterile, non-aged) were approximately 11 MPa for 5 phr unmodified zeolite particles, approximately 14 MPa for the separate addition of 5 phr unmodified zeolite particles and 2.5 phr CoatOSil MP 200 and approximately 17.5 for the addition of 5 phr modified zeolite particles (modified with CoatOSil MP 200).

From the results of the tension test, it may be inferred that the addition of CoatOSil MP 200 leads to an increase of the tear strength (from 11 to 14 MPa). However, the mechanical properties of the XNBR latex films that were cross-linked with modified particles (17.5 MPa) were not achieved by the separate addition. This repeatedly shows the advantage of the modified particles with respect to a more efficient cross-linking and with respect to good mechanical properties.

In order to support the usability of organic particles, cross-linkings were performed with modified fillers containing organic carrier materials. The preparation of the cross-linked latex mixtures took place as described in the foregoing. For the cross-linking, modified fillers of the firm of Grolman Chemikalien Handelsgesellschaft mbH were used, which analogously to the Rima Sil 1200 particles were modified with CoatOSil MP 200. Instead of the Ca silicate carrier, a cross-linked silicone urea derivative was used by Grolman (Rima Process).

The tear strengths of these XNBR latex films were determined for non-sterile and non-aged samples as approximately 27.5 MPa for 3 phr Rima Process, as approximately 22.5 for 5.0 phr Rima Process and as approximately 20 MPa for 7.5 phr Rima Process, for non-sterile and aged samples as approximately 34 MPa for 3 phr Rima Process, as approximately 33 for 5.0 phr Rima Process and as approximately 22.5 MPa for 7.5 phr Rima Process, for sterile and non-aged samples as approximately 22.5 MPa for 3 phr Rima Process, as approximately 23 for 5.0 phr Rima Process and as approximately 18 MPa for 7.5 phr Rima Process, and, for sterile and aged samples, as approximately 30 MPa for 3 phr Rima Process, as approximately 35 for 5.0 phr Rima Process and as approximately 29 MPa for 7.5 phr Rima Process.

The results of the tension test permit the conclusion that a successful cross-linking is also possible with an organic carrier material—i.e. high mechanical strengths can be achieved by the covalent cross-linking of the carboxylate groups even without an ionic cross-linking.

The elongation at break of these latex films was, for non-sterile and non-aged samples, approximately 740% for 3 phr Rima Process, approximately 700% for 5.0 phr Rima Process and approximately 600% for 7.5 phr Rima Process, for non-sterile and aged samples, approximately 720% for 3 phr Rima Process, approximately 690% for 5.0 phr Rima Process and approximately 570% for 7.5 phr Rima Process, for sterile and non-aged samples, approximately 710% for 3 phr Rima Process, approximately 650% for 5.0 phr Rima Process and approximately 570% for 7.5 phr Rima Process, and, for sterile and aged samples, approximately 660% for 3 phr Rima Process, approximately 650% for 5.0 phr Rima Process and approximately 560% for 7.5 phr Rima Process.

The modulus of these XNBR latex films at 50% elongation was, for non-sterile and non-aged samples, approximately 1.3 MPa for 3 phr Rima Process, approximately 1.45 MPa for 5.0 phr Rima Process and approximately 1.8 MPa for 7.5 phr Rima Process, for non-sterile and aged samples, approximately 1.5 MPa for 3 phr Rima Process, approximately 1.7 MPa for 5.0 phr Rima Process and approximately 2 MPa for 7.5 phr Rima Process, for sterile and non-aged samples, approximately 1.25 MPa for 3 phr Rima Process, approximately 1.45 MPa for 5.0 phr Rima Process and approximately 1.82 MPa for 7.5 phr Rima Process, and, for sterile and aged samples, approximately 1.52 MPa for 3 phr Rima Process, approximately 1.8 MPa for 5.0 phr Rima Process and approximately 2.2 MPa for 7.5 phr Rima Process.

In the following exemplary embodiments, it is to be shown that the thermal cross-linking of XNBR latex films is possible not only with polar, water-soluble epoxy cross-linking agents but also with non-polar epoxy derivatives.

EXAMPLE A—CROSS-LINKING WITH BISPHENOL A DIGLYCIDYL ETHER 3 phr bisphenol A diglycidyl ether (Huntsman) is emulsified in 6 phr deionized water containing 0.3 phr Tween 20. Then the emulsion is added to the latex mixture (pH=10.2; ~25 drc) and the latex mixture is stirred at room temperature for 60 minutes. The films are prepared analogously to the described procedure and the thermal cross-linking takes place in the course of the drying of the films in the circulating-air oven.

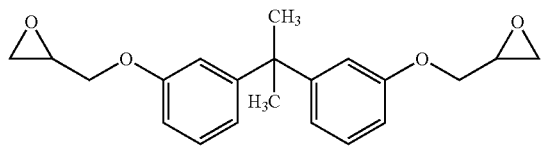 [SMILES: CC(C)(c1cccc(OCC2CO2)c1)c1cccc(OCC2CO2)c1]

Bisphenol A Diglycidyl Ether

EXAMPLE B—CROSS-LINKING WITH A HYDROGENATED BISPHENOL A DIGLYCIDYL ETHER

The preparation takes place analogously to Example A—except, instead of the bisphenol A diglycidyl ether, 3 phr and 5 phr respectively of a hydrogenated bisphenol A diglycidyl ether (EPALLOY®5000 and EPALLOY®5001 respectively of CVC Thermoset Specialities) is used.

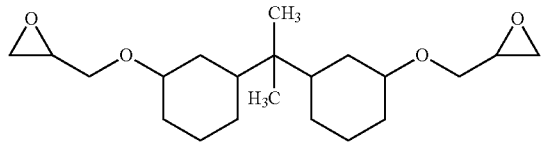 [SMILES: CC(C)(C1CCCC(OCC2CO2)C1)C1CCCC(OCC2CO2)C1]

Hydrogenated Bisphenol A Diglycidyl Ether

EXAMPLE C—CROSS-LINKING WITH A HEXAHYDROPHTHALIC ACID DIGLYCIDYL ETHER

The preparation takes place analogously to Example A—except, instead of the bisphenol A diglycidyl ether, a hexahydrophthalic acid diglycidyl ether (3 phr and 5 phr EPALLOY®5200 of CVC Thermoset Specialities) is used.

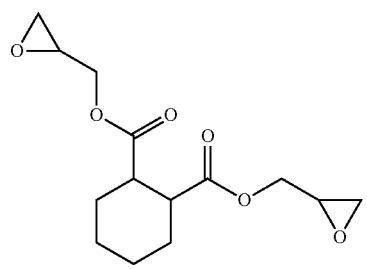 [SMILES: O=C(OCC1CO1)C1CCCCC1C(=O)OCC1CO1]

Hexahydrophthalic Acid Diglycidyl Ether

EXAMPLE D—CROSS-LINKING WITH A 1,4-CYCLOHEXANEDIMETHANOL DIGLYCIDYL ETHER

The preparation takes place analogously to Example A—except, instead of the bisphenol A diglycidyl ether, a 1,4-cyclohexanedimethanol diglycidyl ether (3 phr and 5 phr ERISYS™ GE 22 of CVC Thermoset Specialities) is used.

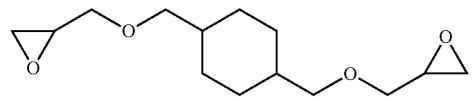 [SMILES: C1CC(COCC2CO2)CCC1COCC1CO1]

1,4-Cyclohexanedimethanol Diglycidyl Ether

The measured mechanical properties of the XNBR latices cross-linked according to Examples A-D are summarized in Table 4.

TABLE 4

Mechanical properties of thermally cross-linked XNBR latex films during use of different epoxides

| Epoxy cross-linker | Concentration of cross-linker [phr] | Tear strength [MPa] | Stress [%] | Stress at 50% elongation [MPa] |
|---|---|---|---|---|
| Bisphenol A diglycidyl ether | 3 | 42.2 | 700 | 1.58 |
| EPALLOY ®5000 | 3 | 39.3 | 700 | 1.53 |
| EPALLOY ®5000 | 5 | 39.9 | 670 | 1.53 |
| EPALLOY ®5001 | 3 | 36.9 | 680 | 1.62 |
| EPALLOY ®5001 | 5 | 38.4 | 670 | 1.59 |
| EPALLOY ®5200 | 3 | 36.8 | 690 | 1.59 |
| EPALLOY ®5200 | 5 | 38.4 | 690 | 1.46 |
| ERISYS ™ GE22 | 3 | 34.0 | 680 | 1.60 |
| ERISYS ™ GE22 | 5 | 34.9 | 670 | 1.48 |

The exemplary embodiments describe possible embodiment variants of the method; diverse combinations of the individual embodiment variants with one another are also possible.

The invention claimed is:
1. A method for the manufacture of a prophylactic article from a diene rubber or carboxylated diene rubber, according to which a layer of a diene latex or carboxylated diene latex is applied on a former and the diene latex or carboxylated diene latex is exclusively cross-linked with a cross-linking agent comprising organic molecules,
  wherein the cross-linking agent is immobilized on inorganic and/or organic particles with formation of modified particles, and the modified particles are added to the diene latex or carboxylated diene latex,
  wherein exclusively the modified particles are used as cross-linking agents,
  wherein the prophylactic article produced has incorporated the modified particles modified with the cross-linking agent comprising the organic molecules,
  wherein silicate-based particles are used as the inorganic particles, and
  wherein the silicate-based particles are selected from a group consisting of silicates with multivalent cations, zeolites, as well as mixtures thereof.

2. The method according to claim 1, wherein a natural zeolite is used as the zeolite particles.

3. The method according to claim 2, wherein a zeolite selected from a group consisting of clinoptilolite, chabasite, phillipsite and analcime as well as mixtures thereof is used as natural zeolite.

4. The method according to claim 1, wherein the particles are modified with an amount of cross-linking agent sufficient for formation of a multiple-layer structure of the cross-linking agent on the particles.

5. The method according to claim 1, wherein the cross-linking of the diene latex or carboxylated diene latex molecules is achieved thermally.

6. The method according to claim 1, wherein the pH of the diene latex or carboxylated diene latex is adjusted to a value of greater than/equal to 9.

7. The method according to claim 1, wherein the cross-linking agent comprising organic molecules is selected from a group consisting of multifunctional epoxides, multifunctional silanes, multifunctional siloxanes, multifunctional thiols, as well as mixtures thereof.

8. Prophylactic article comprising a layer of a diene elastomer or carboxylated diene elastomer, wherein the diene elastomer or carboxylated diene elastomer molecular chains of the diene elastomer or carboxylated diene elastomer are exclusively cross-linked covalently via organic molecules and ionically via metal cations, wherein the metal cations are exclusively part of inorganic particles, wherein the organic molecules are exclusively immobilized on the inorganic particles, wherein silicate-based particles are used as the inorganic particles, and wherein the silicate-based particles are selected from a group consisting of silicates with multivalent cations, zeolites, as well as mixtures thereof.

9. The method according to claim 1, wherein the prophylactic article is a glove.

10. The prophylactic article according to claim 8, wherein the prophylactic article is a glove.

* * * * *